United States Patent

Hasegawa et al.

[11] Patent Number: 4,687,625
[45] Date of Patent: Aug. 18, 1987

[54] PIPING OF NUCLEAR REACTOR CONTAINMENT VESSEL

[75] Inventors: Kunio Hasegawa, Katsuta; Tasuku Shimizu, Hitachi; Tetsuo Horiuchi, Hitachi; Hisao Ito, Hitachi, all of Japan

[73] Assignee: Hitachi, Ltd., Tokyo, Japan

[21] Appl. No.: 659,563

[22] Filed: Oct. 10, 1984

[30] Foreign Application Priority Data

Oct. 13, 1983 [JP] Japan .................................. 58-191386

[51] Int. Cl.$^4$ .............................................. G21C 9/00
[52] U.S. Cl. .................................... 376/292; 376/250; 376/293
[58] Field of Search .................. 52/220, 221; 138/104, 138/110; 165/70; 285/13, 93, 114; 376/250, 282, 283, 291, 292, 402, 293

[56] References Cited

U.S. PATENT DOCUMENTS 3,098,023 7/1963 Schluderberg ...................... 165/70
3,299,417 1/1967 Sibthorpe ............................. 285/93
4,252,611 2/1981 Mizumachi et al. ................ 376/283

FOREIGN PATENT DOCUMENTS 52-57491 5/1977 Japan .................................. 376/292

Primary Examiner—Donald P. Walsh
Assistant Examiner—Richard W. Wendtland
Attorney, Agent, or Firm—Antonelli, Terry & Wands

[57] ABSTRACT

Piping of a nuclear reactor containment vessel comprises pipes passing through the containment vessel and, extending to the outside of the containment vessel, outer shut-off valves each provided at a portion of the pipe which is located at the outside of the containment vessel for closing the pipe and isolating vessels for covering at least outer surfaces of welded portions of the pipes each being located between an outer wall surface of the containment vessel and a portion including the outer shut-off valve and for isolating the covered portions of the pipes from atmosphere.

6 Claims, 6 Drawing Figures

PIPING OF NUCLEAR REACTOR CONTAINMENT VESSEL

BACKGROUND OF THE INVENTION

This invention relates to improvements of piping passing through a nuclear reactor containment vessel.

Generally, in a nuclear power plant, high temperature and high pressure steam generated through thermal energy produced in a nuclear reactor is led from the containment vessel of the reactor to the outside to rotate turbines to generate electricity. After rotating the turbines, steam is condensed into water which is returned to the nuclear reactor in the containment vessel via a feedwater pipe. Besides the main steam pipe for feeding steam to the turbines and the feedwater pipe for returning water to the reactor, pipes for transporting steam and water, for example, a main steam drain line for releasing drain of main steam, nuclear core spray pipes for cooling the reactor core, pipes of system for removing residual heat for cooling the reactor are passed through the containment vessel. Moreover, pipes for transporting gas, such as drywell ventilating pipes for performing ventilation of the containment vessel and pipes of an off-gas system for treating gases are also passed through.

As aforesaid, a multiplicity of pipes through which steam, water and gas are transported are passed through the containment vessel, and each of these pipes is formed with shut-off valves mounted on inside and outside of the wall of the containment vessel. For example, Japanese Patent Application Laid-Open No. 36490/79 discloses the piping passing through the containment vessel and the valves in a nuclear reactor.

The main steam pipe of a boiling-water reactor (BWR) shown in FIG. 1 will now be described.

Water changes into high temperature and high pressure steam due to heat produced by nuclear reactions taking place in a pressure vessel 1 of the nuclear reactor. Steam thus generated usually has a temperature of about 270° C. and a pressure of about 70 kg/cm². Steam generated within the pressure vessel 1 is led from a containment vessel 3 of the nuclear reactor via a main steam pipe 2 extending through a wall of the containment vessel 3 to the outside thereof and then to a turbine shed, not shown, where steam rotates turbines to actuate a generator to generate electricity. After being released from the turbines, steam changes back to water which is returned to the pressure vessel 1 in the containment vessel 3.

The containment vessel 3 is formed of steel and of a substantially truncated conical configuration. It has a diameter of about 25–29 m at the bottom and is enclosed by a concrete shell 6 at the outside.

The pressure in the containment vessel 3 is usually at the atmospheric pressure level. However, the containment vessel 3 is designed such that its shell is capable of withstanding an internal pressure equivalent to several atmospheric pressure supposing that an accident happens involving a guillotine rupture of pipes within the containment vessel and high temperature and high pressure steam gushes out of the pipes.

In the case of an advanced boiling-water reactor (ABWR), the containment vessel 3 of the reactor is formed of concrete as shown in FIG. 2 and designed such that an internal pressure is borne by its concrete wall. The concrete wall has a lining of steel plates.

In both the BWR and ABWR, the containment vessel 3 has a function to confine the radioactive materials and to prevent them from being scattered in atmosphere when accidents such as breakage of pressure vessel or piping rupture occur. Thus, the pipes passing through the containment vessel are each provided with valves mounted on the inside and the outside of the containment vessel. Such valves are provided to the main steam pipe as well, which will be described by referring to FIG. 1.

The main steam pipe 2 is usually made of carbon steel and has a diameter in the range between 400 and 700 mm and a wall thickness in the range between 20 and 40 mm. One nuclear power plant generally has four systems of main steam pipe. Each system of main steam piping 2 is provided with an inner main steam shut-off valve 4 and an outer main steam shut-off valve 5 mounted near an inner wall surface and an outer wall surface of the containment vessel 3 respectively as double safety means. The main steam shut-off valves 4 and 5 are closed when steam leaks or other trouble occurs during the operation of the reactor.

When steam leaks occur in the main steam pipe between steam nozzles of the pressure vessel 1 and the inner main steam shut-off valve 4, for example, the inner main steam shut-off valve 4 is closed to cut off the supply of steam to the turbine system while allowing steam to spread within the containment vessel 3. The closure of the inner main steam shut-off valve 4 results in the radioactive steam being confined within the containment vessel 3.

Also, when steam leaks occur in the main steam pipe between the outer main steam shut-off valve 5 and the turbines, the outer main steam shut-off valve 5 is closed and the supply of steam to the turbines is interrupted, thereby minimizing the leaks of steam.

When steam leaks occur in the main steam pipe between the inner main steam shut-off valve 4 and outer main steam shut-off valve 5, the two shut-off valves 4 and 5 are closed to minimize the steam leaks.

Between the two shut-off valves 4 and 5, the main steam pipe 2 extends through an aperture formed in the wall of the containment vessel 3 and is secured to the wall. The containment vessel 3 being used at room temperature, loads are applied by thermal stresses to the portion of the main steam pipe that is secured to the wall of the containment vessel 3, so that the main steam pipe 2 is mounted to the wall of the containment vessel 3 by utilizing highly advanced technology. Yet, it is inevitable that crack formation might occur in the main steam pipe 2 in a portion thereof between the outer wall surface of the containment vessel and a portion of the main steam pipe 2 including the outer main steam shut-off valve 5, thereby causing steam to leak. It is for the purpose of preventing this steam leak that the inner main steam shut-off valve 4 is provided.

In the containment vessel of the prior art described hereinabove, the main steam pipe 2 has the problem that in the event of steam leaks occuring between the outer wall surface of the containment vessel 3 and the portion of the main steam pipe 2 including the outer main steam shut-off valve 5, steam would be released into the atmosphere outside the containment vessel 3 during the period of time from the occurrence of the accident to the closure of the inner main steam shut-off valve 4 and the area of radioactive contamination is enlarged.

SUMMARY OF THE INVENTION

An object of this invention is to provide piping of a nuclear reactor containment vessel which can prevent the radioactive materials from being scattered in atmosphere in case of leaks occuring at a pipe between an outer wall surface of the containment vessel and a portion of the pipe including an outer shut-off valve provided at the outside of the containment vessel and omit an inner shut-off valve provided in the containment vessel as a means of a double safety means.

The piping of a nuclear reactor containment vessel of this invention comprises pipes passing through the containment vessel and extending to the outside of the containment vessel, outer shut-off valves each provided at a portion of the pipe which is located at the outside of the containment vessel and isolating vessels for covering at least outer surfaces of welded portions of the pipes each being located between an outer wall surface of the containment vessel and portion including the outer shut-off valve and for isolating the covered portions of the pipes from atomsphere. Preferably, the isolating vessels include bellows constructions and steam detectable transducers.

DETAILED DESCRIPTION OF THE PREFERRED EMBODIMENTS

Figure 3:
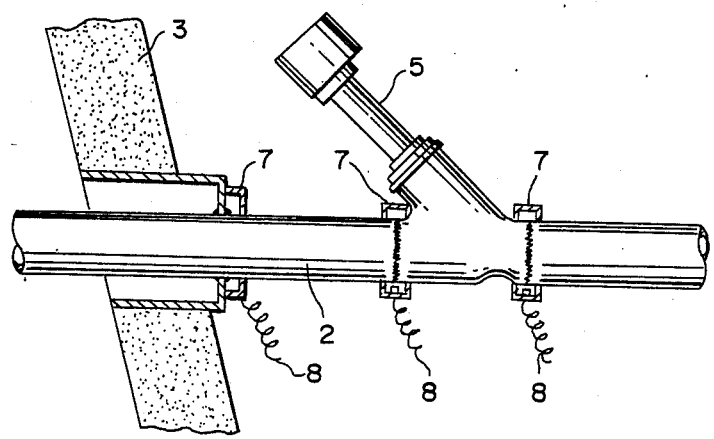
FIGS. 3, 4 and 5 are views showing different embodiments of the invention.

FIG. 3 shows one embodiment of the invention, in which a main steam line 2 extends through a containment vessel 3 of a nuclear reactor. Usually, welds of the main steam line 2, including butt welded joints between pipe and pipe and between pipe and shut-off valve, have a higher possibility of crack growth in comparison with the parent metal because of defects in weld produced on welding, thermal influences exerted on welding and the difference in mechanical properties between the welded metal and the parent metal. Thus, steam leaks have tended to occur mainly in these welded portions. Therefore, in this embodiment, a plurality of isolating vessels 7 are provided to cover welded portions of the main steam pipe 2 which is located between an outer wall surface of the containment vessel 3 and a portion including an outer main steam shut-off valve 5 provided at the outside of the containment vessel 3 to isolate them from the atmosphere. The provision of the isolating vessel 7 enables a steam leak through the weld of the main steam pipe 2 to be confined in the isolating vessel 7, thereby preventing the steam from spreading to the atmosphere.

The isolating vessel 7 may be equipped with a steam leak detectable transducer 8 such as a moisture detector. The provision of a steam detectable transducer enables a steam leak to be detected quickly and permits the plant to be shut down earlier than would be the case if no transducer were provided, thereby increasing safety and reliability.

Figure 4:
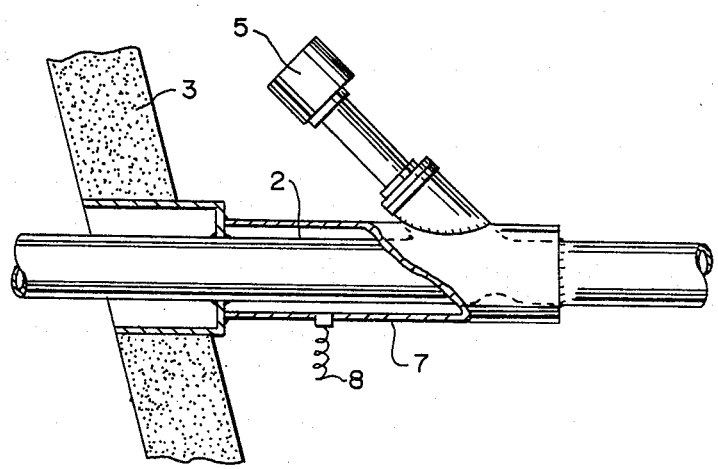

FIG. 4 shows another embodiment of the invention, in which the entire outer surface of a portion of the main steam pipe 2 which is located between the outer wall surface of the containment vessel 3 and a portion including the outer main steam shut-off valve 5 is covered with one isolating vessel 7 which is equipped with a steam detectable transducer 8. A space defined between the isolating vessel 7 and the main steam pipe 2 may be communicated with the interior of the containment vessel 3. By this arrangement, leaked steam can be confined in the isolating vessel 7 and is prevented from spreading to the atmosphere in the same way as the aforementioned embodiment even if leaks occur at other portions than the abovementioned welded portions of the main steam pipe 2 which is located between the outer wall surface of the containment vessel 3 and the portion including the outer main steam shut-off valves 5.

In a containment vessel of the type in which more than two main steam pipes 2 of a plurality of systems are located not so far apart from each other, portions of the main steam pipes 2 which are located between the outer wall surface of the containment vessel 3 and portions including the respective outer main steam shut-off valves 5 may be covered with one isolating vessel 7. In this case, the interior of the isolating vessel 7 may be divided into sections according to the respective main steam pipes 2, and each section may be provided with a steam leak transducer 8.

Figure 5:
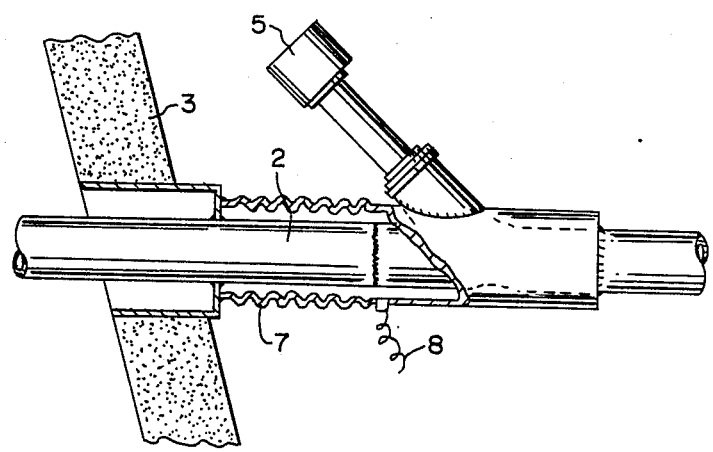

FIG. 5 shows another embodiment of the invention in which an isolating member 7 including a bellows structure having flexibility covers the entire outer surface of a portion of the main steam pipe 2 which is located between the outer wall surface of the containment vessel 3 and the portion including the outer main steam shut-off valve 5. In normal operations, the main steam pipe 2 rises in temperature to about 270° C. Therefore, if the isolating vessel 7 were formed only of rigid material and firmly fixed to the main steam pipe 2, inordinately high thermal stresses might occur in the main steam pipe 2. To avoid this trouble, the embodiment shown in FIG. 5 provides the isolating vessel 7 with a bellows construction. The invention is not limited to this specific form of isolating vessel 7 and the isolating vessel 7 may be formed entirely of a bellows structure.

Figure 1:
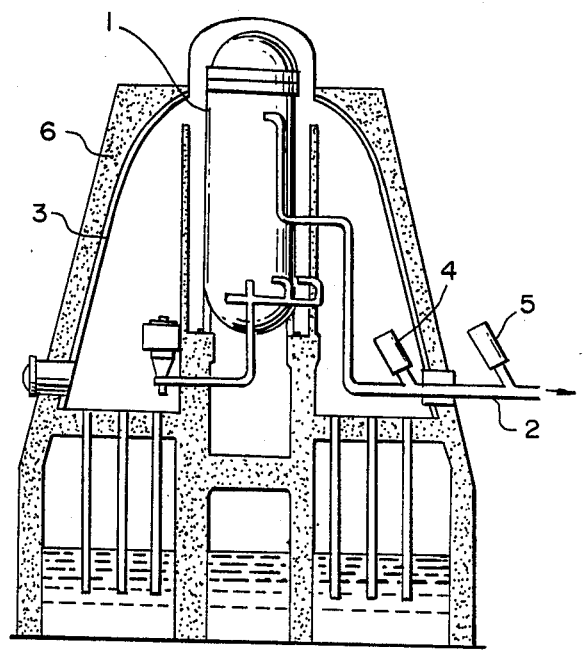
FIG. 1 is a sectional view of a containment vessel of a boiling-water reactor of the prior art and a main steam line, showing their structural relation.
Figure 2:
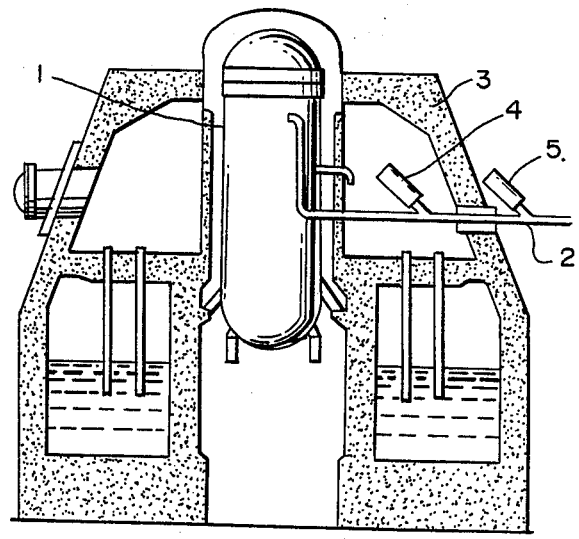
FIG. 2 is a sectional view of a containment vessel of an advanced boiling-water reactor of the prior art and a main steam line, showing their structural relation.
Figure 6:
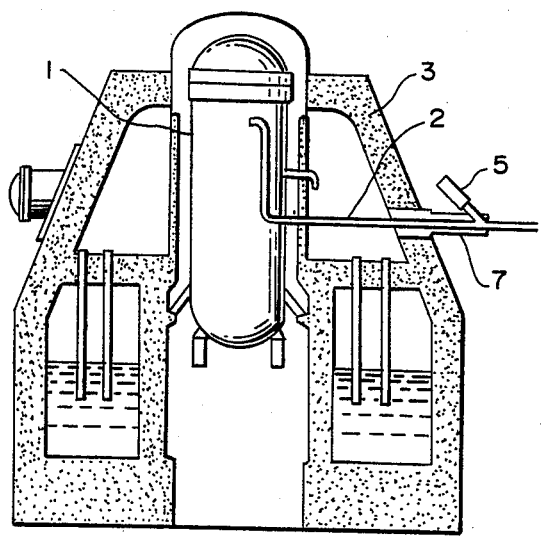
FIG. 6 is a sectional view of a containment vessel of an advanced boiling-water reactor and a main steam line, showing the containment vessel being reduced in size as the result of elimination of the inner main steam shut-off valve according to the invention.

The embodiments of the invention shown and described hereinabove provide at least one isolating vessel 7 to cover the portion of the main steam pipe 2 located outside the containment vessel 3. Thus, even if a steam leak occurs in any portions of the main steam pipe 2 which are located between the outer wall surface of the containment vessel 3 and the portion including the outer main steam shut-off valve 5, the radioactive steam is prevented from spreading to the atmosphere. This eliminates the need to mount the inner main steam shut-off valve 4 usually provided at the inside of the containment vessel of the prior art, thereby offering the following advantages:

The main steam shut-off valves which are usually about 4 m in length are mounted obliquely to the main steam pipe. Thus, each main steam shut-off valve is dimensioned such that it extends about 3 m both vertically and horizontally. If the inner main steam shut-off valve can be omitted, then the diameter of the containment vessel at its bottom can be reduced from the range between 25 and 29 m in the prior art to the range between about 20 and 24 m, thereby enabling a compact size and a light weight to be obtained in a containment vessel. This advantage will be further described by referring to the ABWR shown in FIG. 6. The ABWR comprises the isolating vessel 7 mounted to the portion of the main steam pipe 2 which is located between the outer wall surface of the containment vessel 3 and the portion including the outer main steam shut-off valve 5, and the inner main steam shutoff valve 4 which has hitherto been required in a containment vessel of the prior art as shown in FIG. 2 is omitted. By providing the main steam pipe 2 with the isolating vessel 7 and eliminating the inner main steam shut-off valve 4, the diameter of the containment vessel 3 at its bottom can be reduced to a diameter smaller than the diameter of a containment vessel of the prior art having the inner main steam shut-off valve, thereby enabling the building cost to be greatly reduced.

The invention provides a solution to the problem which the containment vessel of the prior art was faced with that when a steam leak occurs in the portion of the main steam pipe which is located between the outer wall surface of the containment vessel and the portion including the outer main steam shut-off valve, the steam leak would be released to the atmosphere before the inner main steam shut-off valve is closed. The invention is capable of avoiding the spread of radioactive materials to the atmos- phere.

The elimination of the inner main steam shut-off valve enables the size of the containment vessel of a nuclear reactor to be reduced, thereby contributing to a reduction in building cost.

Further, leaked steam is trapped in the isolating vessel, the detection of the leaked steam becomes fast and accurate by providing a steam leak detectable transducer and thus the invention can contribute to the emergency stop of the plant.

While the invention has been shown and described by referring to a main steam pipe extending from the containment vessel of a nuclear reactor to outside through an aperture formed in the wall of the containment vessel, it is to be understood that the invention is not limited to the main steam pipe and can have application any pipes connected to the containment vessel. As described hereinabove, the piping of the containment vessel includes a multiplicity of pipes including a feedwater pipe, a main steam drain pipe, reactor core spray water pipes, a residual heat removing pipe, a drywell ventilating pipe, an off-gas pipe, etc., and the invention may have application in any one of these pipes.

What is claimed is:

1. Piping of a nuclear reactor containment vessel comprising:

pipes in the interior of the containment vessel passing through a wall of the containment vessel and extending to the outside of the containment vessel;

that portion of said pipes inside said containment vessel having no shut-off valve therein;

outer shut-off valves each provided at a portion of the pipe which is located at the outside of the containment vessel; and isolating vessel means for covering a portion of the pipe extending from the containment vessel up to and including a portion of the pipe where the outer shut-off valve is located for isolating the covered portions of the pipe from atmosphere, thereby eliminating a requirement for an inner shut-off valve on the portion of the pipe in the interior of the containment vessel and enabling a reduction in size of the containment vessel.

2. Piping of a nuclear reactor containment vessel, as claimed in claim 1, wherein the containment vessel contains a boiling water nuclear reactor pressure vessel, and the pipes having an outer shut-off valve at the portion of the pipe located outside the containment vessel pass into the interior of the containment vessel without inner shut-off valves being provided therefor.

3. Piping as claimed in claim 1, wherein said isolating vessel means include bellows constructions having flexibility.

4. Piping as claimed in claim 3, wherein said isolating vessel means include steam leak detectable transducers.

5. Piping as claimed in claim 1, wherein one of said pipes in a main steam pipe and one of said outer shut-off valves is a main steam shut-off valve.

6. Piping as claimed in claim 5, wherein said isolating vessels include steam leak detectable transducers.

* * * * *